July 14, 1964 W. DÖRPER ETAL 3,140,571
METHOD OF SEALING PLASTIC CONTAINERS AND BOTTLES
Filed Feb. 10, 1961
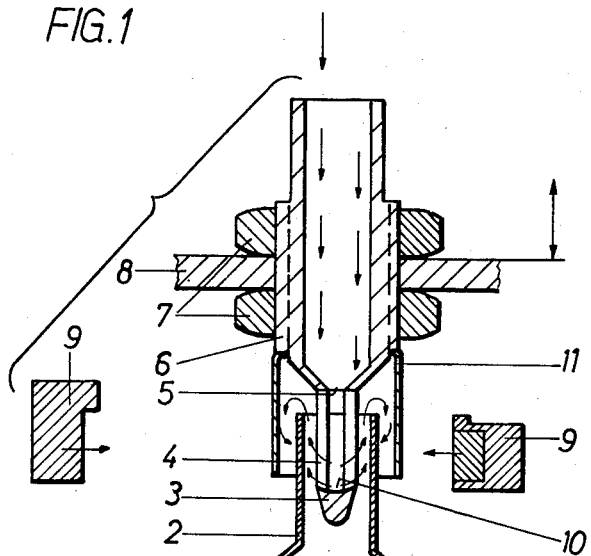
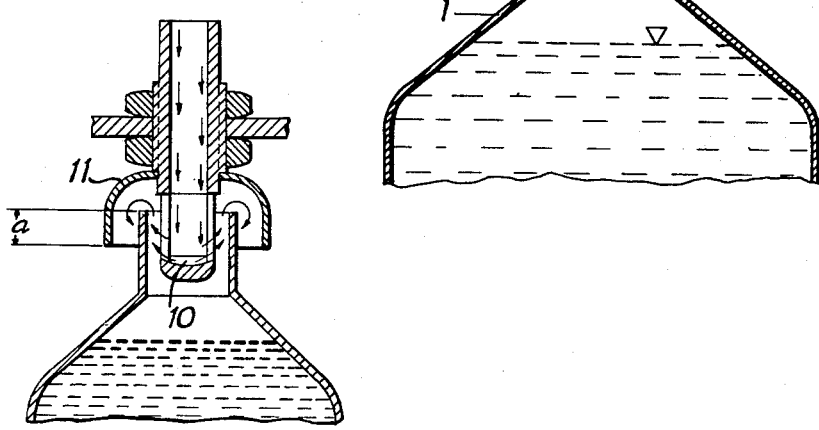
INVENTORS:
WILLI DÖRPER, WOLFGANG RAUH.
BY
their ATTORNEYS United States Patent Office 3,140,571
Patented July 14, 1964

3,140,571
METHOD OF SEALING PLASTIC CONTAINERS AND BOTTLES
Willi Dörper, Leverkusen, and Wolfgang Rauh, Aachen, Germany, assignors to Agfa Aktiengesellschaft, Leverkusen, Germany, a corporation of Germany
Filed Feb. 10, 1961, Ser. No. 88,529
Claims priority, application Germany Feb. 20, 1960
1 Claim. (Cl. 53—39)

This invention relates to a method and means for sealing plastic containers and bottles. In abandoned application Serial No. 818,347, filed June 5, 1959 in the name of Hermann Marks, which application is assigned to the assignee of this case, there is described a method of and an apparatus for sealing plastic containers and bottles, in which the inside wall of the neck of the bottle is heated up to its melting point by using a hollow piston introduced therein but spaced therefrom and having outlet apertures for a stream of hot air or gas, and is compressed after removal of the piston.

It has now been found that the method described in application Serial No. 818,347 can be so developed and improved that only the concave base of the piston that is described in the said application is used and that the lateral walls formed with outlet apertures are replaced by a few connecting webs between the base and supply pipe, so that the stream of hot gas directed on to the filling material is conveyed back from the piston base to the bottle opening on the inside wall of the bottle neck. By this means, a very efficient heating is obtained without the filling material being strongly contacted by the injected hot air.

An additional shortening of the welding or heat-sealing period may be achieved very advantageously by providing that the hot air or gas stream is in addition led around the rim on the outside of the neck of the bottle.

This method can be effected in a very advantageous manner by means of a pan-like element which is formed from the base of the hollow piston, which is spaced from the supply pipe for the air or gas stream and is fixed thereto by suitable connecting webs of small cross-section, which webs replace the peripheral wall of the piston described in application Serial No. 818,347 which is formed with outlet openings.

The deflection of the hot air on to the external walls is advantageously achieved by fixing a collar-like or bell-shaped baffle member on the supply pipe spaced apart from the oustide wall and the opening of the bottle neck.

The opening of the supply pipe is preferably in the form of a nozzle sot that a uniform stream of hot air or gas which is preferably directed is produced.

The method and apparatus are more fully explained by reference to the accompanying drawing. FIG. 1 shows a longitudinal section through the apparatus during the sealing operation, and FIG. 2 is a corresponding longitudinal section at an angle of 90° around $a$—$a$ in FIG. 1.

According to FIG. 1 the plastic bottle 1 comprises a neck 2 with a substantially oval cross-section. During the sealing operation, an element 3 is introduced into this neck, which element is to be considered as the base of a hollow piston which is made pan-shaped on top 10. It is so introduced that it does not touch the inside of the neck of the bottle. This element 3 is fixed to the opening or mouth 5 of a supply pipe 6, by means of connecting webs 4 of very small cross-section, through which pipe 6 a stream of hot gas or air is conducted. The pipe 6 is connected to a heating source (not shown) which serves to melt the upper portion of the bottle neck.

By means of nuts 7, the supply pipe 6 is fixed on a holder 8 which is moved up and down in a timed cycle.

Arranged externally of the bottle neck 2 is a pair of presser jaws 9 which, as soon as the element 3 is withdrawn from the bottle neck, compreses the softened portion thereof and thus produces a tight bottle closure.

As illustrated, the element 3 is made pan-shaped on its upper side 10 and is drawn out in tapered form towards the bottom end. By this means, centering can be substantially facilitated, even when the bottles are not located at the correct position. The surface 10 of the element 3 can also be made flat. It is disposed in alignment with the supply pipe 6 and deflects the stream of air towards the internal wall of the bottle neck in the direction of the bottle neck opening.

Secured on the lower portion of the supply pipe 6 near the mouth 5 is a bell 11 which is so designated that it can be positioned over the bottle neck without touching the latter. The periphery of the bell preferably conforms approximately to the shape of the bottle neck cross-section. In a simplified form, the bell can also be made as a collar.

The operation of the apparatus is as follows: the element 3 is introduced into the bottle neck which is thereto simultaneously enclosed by means of the bell 11 in the heat-sealing range $a$. Hot air or gas is injected through the supply pipe 6, this being conducted towards the upper portion of the bottle neck along its inside wall as far as the bottle neck opening (see arrows indicating flow in FIGS. 1 and 2).

In order to increase the deflecting action, it is advantageous to make the mouth 5 of the supply pipe 6 in the form of a nozzle. The air, while still hot, is again deflected by the bell 11 and now flows along the outside of the bottle neck. Thus, with maximum utilization of the heat energy, a very uniform and efficient heating of the bottle neck is produced in the shortest possible period of time.

When the neck of the bottle starts to melt, the element 3 is withdrawn and the bottle neck is compressed by means of presser jaws 9 and thus tightly sealed. One particular advantage of the apparatus developed for this method is that the element 3 is also readily accessible and can be simply manufactured and is easy to clean.

We claim:

A process for sealing the open neck of a thermoplastic bottle which comprises ejecting a stream of hot gas against the inside wall of the neck of the bottle by means of a hollow piston introduced into the bottle but spaced therefrom, the hot gas ejected through the piston walls being drawn upwardly out of the bottle neck and then deflected downwardly around the exterior thereof so as to heat both the internal and external surfaces of the bottle neck, continuing the hot gas ejection until the inside wall of the bottle neck is heated up to its melting point and softened, and then withdrawing the piston from the bottle neck and closing the latter by compression.

References Cited in the file of this patent
UNITED STATES PATENTS

| | | |
|---|---|---|
| 2,156,441 | Watson et al. | May 2, 1939 |
| 2,423,237 | Haslacher | July 1, 1947 |
| 2,715,087 | Barradas | Aug. 9, 1955 |
| 2,926,474 | Morrison et al. | Mar. 1, 1960 |
| 2,928,219 | Gubler | Mar. 15, 1960 |
| 2,929,182 | Silverstein | Mar. 22, 1960 |
| 2,935,831 | Saumsiegle | May 10, 1960 |
| 2,982,074 | Shiu | May 2, 1961 |
| 3,035,958 | Wilkins | May 22, 1962 |